(12) United States Patent
Sauer et al.

(10) Patent No.: US 12,476,799 B2
(45) Date of Patent: Nov. 18, 2025

(54) CONSTRAINED OPERATION OF A FIELD DEVICE

(71) Applicant: Siemens Aktiengesellschaft, Munich (DE)

(72) Inventors: Markus Sauer, Munich (DE); Tobias Aigner, Munich (DE); Nejc Zupan, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 250 days.

(21) Appl. No.: 17/287,694

(22) PCT Filed: Oct. 7, 2019

(86) PCT No.: PCT/EP2019/077091
§ 371 (c)(1),
(2) Date: Apr. 22, 2021

(87) PCT Pub. No.: WO2020/083630
PCT Pub. Date: Apr. 30, 2020

(65) Prior Publication Data
US 2021/0399885 A1 Dec. 23, 2021

(30) Foreign Application Priority Data

Oct. 23, 2018 (EP) .................................... 18202064

(51) Int. Cl.
*H04L 9/08* (2006.01)
*G05B 19/042* (2006.01)

(52) U.S. Cl.
CPC ........ *H04L 9/0838* (2013.01); *G05B 19/0428* (2013.01); *H04L 9/0825* (2013.01);
(Continued)

(58) Field of Classification Search
CPC ..... H04L 9/0838; H04L 9/0825; H04L 9/085; G05B 19/0428; G05B 2219/25205; G05B 2219/25428
See application file for complete search history.

(56) References Cited

U.S. PATENT DOCUMENTS 8,391,488 B2 * 3/2013 Qiu ..................... H04L 9/083
726/19
8,761,712 B1 * 6/2014 Howard ................ G08C 23/04
455/352
(Continued)

FOREIGN PATENT DOCUMENTS

CN 101385274 A 3/2009
CN 102089769 A 6/2011
(Continued)

OTHER PUBLICATIONS

PCT International Search Report and Written Opinion of International Searching Authority mailed Mar. 2, 2020 corresponding to PCT International Application No. PCT/EP2019/077091 filed Jul. 10, 2019.

*Primary Examiner* — Bassam A Noaman
(74) *Attorney, Agent, or Firm* — Schmeiser, Olsen & Watts LLP

(57) ABSTRACT

Provided is a method for operating a field device. The field device is configured for interacting with a control device. According to the method, a base key is received from a key generation device. A current constraint parameter relating to a predefined operating constraint for operating the field device is determined. A key is generated based on the base key and the current constraint parameter. The field device interacts with the control device using the generated key.

20 Claims, 3 Drawing Sheets

Figure 1:
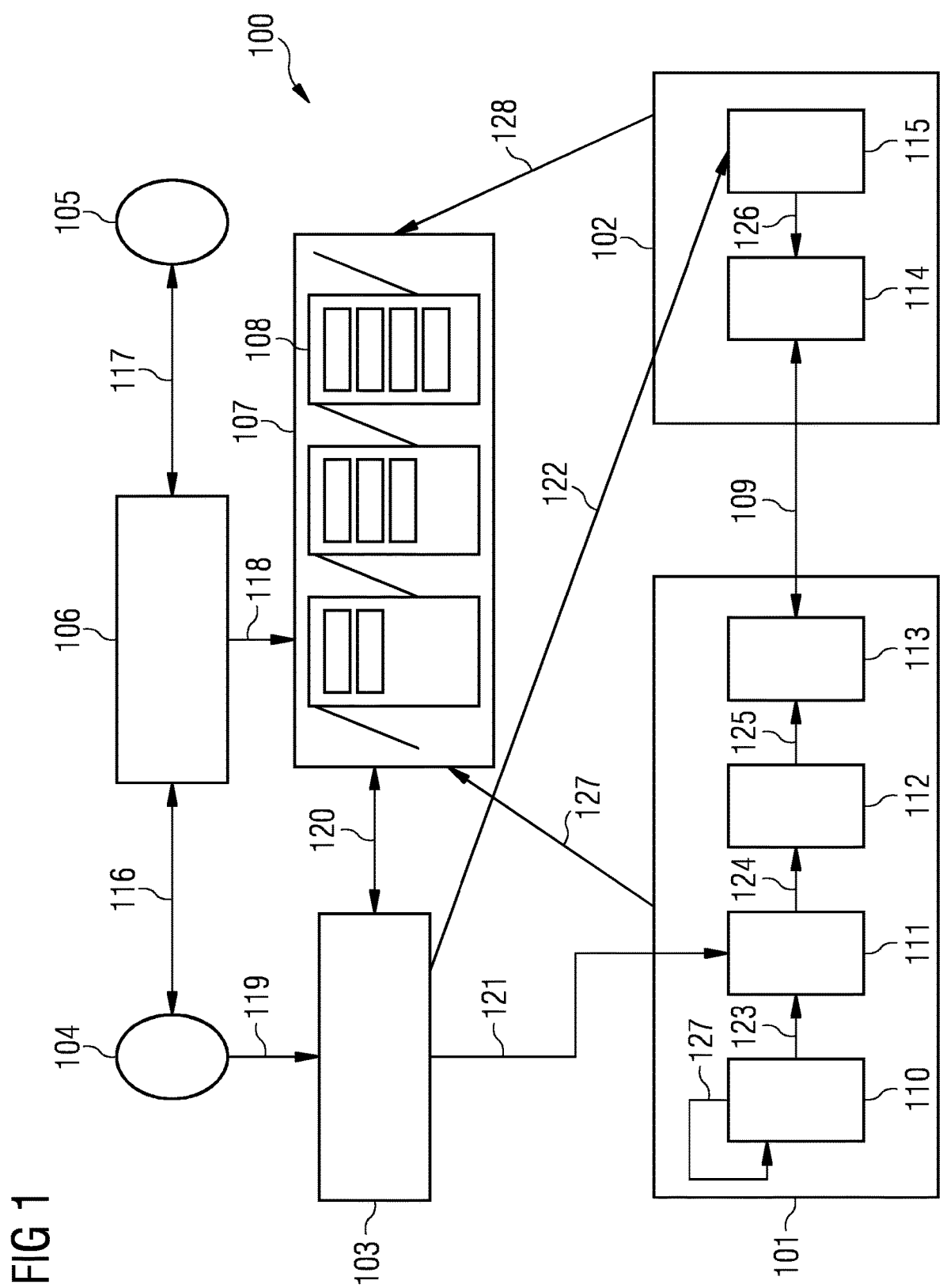

(52) U.S. Cl.
CPC .... *H04L 9/085* (2013.01); *G05B 2219/25205* (2013.01); *G05B 2219/25428* (2013.01)

(56) References Cited

U.S. PATENT DOCUMENTS

| | | | |
|---|---|---|---|
| 9,967,097 B2* | 5/2018 | Sivaramamurthy | H04L 9/0877 |
| 11,423,475 B2* | 8/2022 | Wang | H04L 9/3247 |
| 2006/0059096 A1 | 3/2006 | Dublish et al. | |
| 2008/0037785 A1 | 2/2008 | Gantman et al. | |
| 2010/0011216 A1 | 1/2010 | Holm-Hansen et al. | |
| 2010/0153736 A1 | 6/2010 | Kilian | |
| 2010/0323714 A1* | 12/2010 | Schmidt | H04W 48/18 455/456.1 |
| 2012/0191614 A1* | 7/2012 | Babitch | G06Q 40/02 705/44 |
| 2016/0197729 A1* | 7/2016 | Jones | H04L 9/3215 713/184 |
| 2017/0237556 A9* | 8/2017 | Denning | H04L 9/14 713/168 |
| 2017/0270528 A1* | 9/2017 | Prakash | G06Q 20/3224 |
| 2018/0097622 A1* | 4/2018 | Kurokawa | H04L 9/0872 |
| 2018/0276662 A1 | 9/2018 | Zavesky et al. | |
| 2018/0357397 A1 | 12/2018 | Fink et al. | |
| 2021/0281570 A1* | 9/2021 | Schoinianakis | H04L 63/06 |

FOREIGN PATENT DOCUMENTS

| | | |
|---|---|---|
| CN | 108370375 A | 8/2018 |
| DE | 102006035526 A1 | 1/2008 |

\* cited by examiner

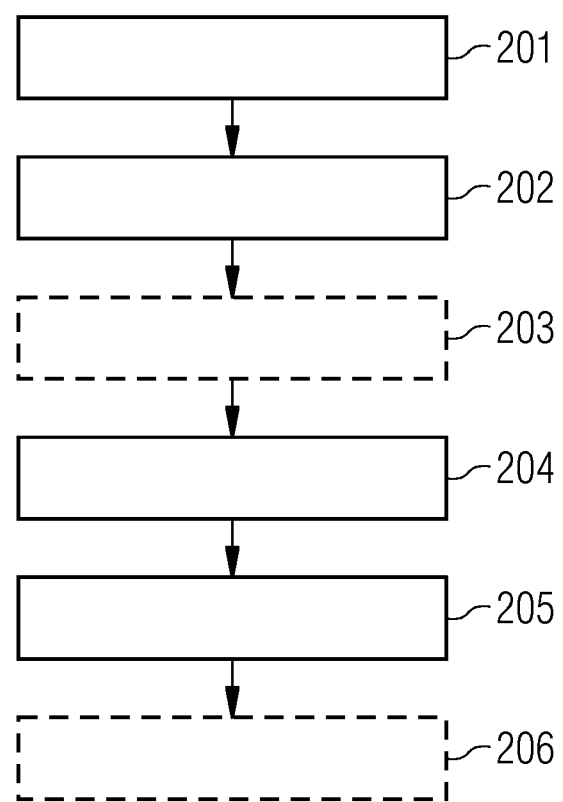

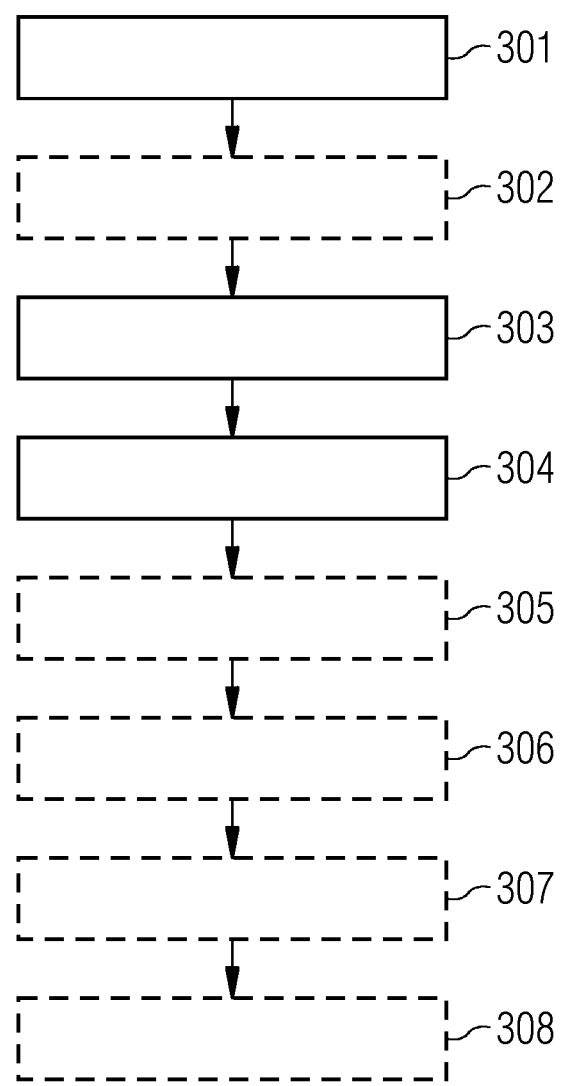

CONSTRAINED OPERATION OF A FIELD DEVICE

CROSS-REFERENCE TO RELATED APPLICATIONS

This application claims priority to PCT Application No. PCT/EP2019/077091, having a filing date of Oct. 7, 2019, which is based off of EP Application No. 18202064.4, having a filing date of Oct. 23, 3018, the entire contents both of which are hereby incorporated by reference.

FIELD OF TECHNOLOGY

The following relates to a method for operating a field device, in particular to operating a field device based on an interaction between the field device and a control device taking into account predefined operating constraints. The following relates furthermore to a method for operating a key generation device for generating encryption keys used for an interaction between a field device and a control device. The following relates furthermore to a field device and a key generation device which implement the methods of the present application.

BACKGROUND

Devices, for example communication devices, IT devices, terminal devices, edge devices, or infrastructure devices like a gas turbine, a current generator or a transformer, may be restricted to be operated under certain conditions only, for example at certain times or certain locations only. An owner or manufacturer of the device may want to enforce such constraints to meeting legal requirements, service agreements or to be compliant with export restrictions. Typically, such constraints may be part of legal contracts and handled by agreed penalties for breach of contract. Nevertheless, enforcing such constraints may be difficult.

SUMMARY

Therefore, an aspect relates to enforcing such constraints.

According to an embodiment, a method for operating a field device is provided. The field device is configured for interacting with a control device. Interacting may comprise for example communicating data between the field device and the control device and/or authenticating the control device with respect to the field device, for example for configuring the field device by an application provided at the control device. The field device may comprise for example a computing device, a gas turbine, an Internet of Things (IoT) device, a sensor, a controller, a hard disk, a laptop, or a smart phone. The field device may be a device whose operability is to be restricted, for example as agreed between a manufacturer and an owner or user of the device. Therefore, the field device may also be called "device to protect" or "system to protect". According to the method, at the field device, a base key is received from a key generation device. The key generation device may comprise a dedicated device or may comprise a component or application, which may be part of another device, for example a network server or a personal computer. Further, a current constraint parameter relating to a predefined operating constraint for operating the field device is determined.

The predefined operating constraint may define one or more constraints which must be fulfilled for operating the field device. The current constraint parameter is indicative of a current information which is related to the predefined operating constraint. For example, the predefined operating constraint may indicate a location at which the field device is allowed to be operated or to execute a predefined function. The current constraint parameter may comprise a current location of the field device. The current location of the field device may be determined based on a global positioning system, for example GPS, or may be determined based on any other positioning system, for example based on positioning information retrieved from a communication network.

In other examples, the predefined operating constraint may indicate a predefined timing at which the field device is allowed to be operated or to execute a predefined function. In this case, the current constraint parameter may comprise a current time. The current time may define for example a current time of day and/or a current date. Accordingly, the predefined operating constraint may indicate a time interval, a starting time and/or an ending time defining the times at which the field device is allowed to the operated or to execute the predefined function. The predefined function may relate to a configuration or placing into operation of the field device issued by the control device.

Further according to the method, based on the base key and the current constraint parameter, a key is generated at the field device. Using the generated key, the field device interacts with the control device.

The control device may be configured with a key which is matching to the key generated at the field device when the field device is at the allowed location or interacting with the control device takes place at the allowed operating times. Whenever the field device moves or the time changes, the key generated at the field device may be updated. When the field device is not arranged at the allowed location or the interaction with the control device takes place outside the allowed operating times, the key configured at the control device will not match to the updated current key of the field device anymore such that interacting with the control device will not work and is thus inhibited. As such, the predefined operating constraints can be enforced.

As described above, the predefined operating constraint may indicate a location at which the field device is allowed to execute the predefined function. According to an example, the field device may receive, from the key generation device, precision information indicating a geographical range with respect to the location within which the field device is allowed to execute the predefined function. The key may be generated based on the precision information. Such, the precision information may define an area in which the field device is allowed to execute the predefined function. As long as the field device is located within the geographical range with respect to the location or within the area defined by the geographical range, the generated key remains the same such that interaction with the control device using the generated key is possible. However, when the field device is moved out of the area defined by the geographical range, the generated key may change and therefore the interaction with the control device is not possible anymore such that the predefined functions cannot be executed anymore. However, when the field device is moved back into the area defined by the geographical range, the newly generated key may be again such that it allows interaction with the control device, for example such that the predefined functions can be executed. In other word, when the field device is moved back into the area defined by the geographical range, the generated key may revert back to the key previously defined within this area and interaction with the control device is possible due to the matching keys.

As described above, the predefined operating constraint may indicate a predefined timing at which the field device is allowed to execute a predefined function. According to an example, the field device may receive precision information indicating a time window with respect to the timing within which the field device is allowed to execute the predefined function. The field device may generate the key based on the precision information. For example, the precision information may define in combination with the timing one or more time intervals in which the field device is allowed to execute the predefined function. As long as the current time is within the time interval, the generated key remains the same such that interaction with the control device using the generated key is possible. When the time exceeds the time interval, the generated key may change and interaction with the control device is not possible anymore such that the predefined functions cannot be executed anymore.

According to another example, audit trail information is reported to a distributed database. The audit trail information indicates interactions of the field device interacting with the control device using the generated key. The distributed database may comprise for example a decentralized distributed database or a database realized as a distributed ledger, in particular as a blockchain. By logging the interactions between the field device and the control device in the distributed database, an audit trail for the predefined operating constraint, which may be agreed by for example a manufacturer of the field device and an owner of the field device or by an owner of the field device and the user of the field device, may be provided.

A distributed ledger (also called a shared ledger, or Distributed Ledger Technology, DLT) may be considered as a consensus of replicated, shared, and synchronized digital data geographically spread across multiple sites, countries, or institutions. There is no central administrator or centralized data storage. A peer-to-peer network may be required as well as consensus algorithms to ensure replication across nodes is undertaken. The distributed ledger database may be spread across several nodes (devices) on a peer-to-peer network, where each replicates and saves an identical copy of the ledger and updates itself independently. The primary advantage is the lack of central authority. When a ledger update happens, each node constructs the new transaction, and then the nodes vote by consensus algorithm on which copy is correct. Once a consensus has been determined, all the other nodes update themselves with the new, correct copy of the ledger. Security may be accomplished through cryptographic keys and signatures.

An example of a distributed ledger is the blockchain. Hereinafter, various techniques will be primarily described with respect to an implementation using the blockchain, for sake of simplicity. However, similar techniques may be readily applied to other kinds and types of distributed ledgers.

A blockchain is a replicated distributed ledger that verifies and stores transactions occurring in a peer-to-peer network. A blockchain does not rely on the operations of any central trusted authority. Instead, its trustworthiness is derived from the blockchain algorithm and optionally an incentive mechanism for processing nodes in the network. Blockchains provide a decentralized protected mechanism of storing transactions. Examples of transactions include digital currency, smart contracts, and data in an Internet of Things application. The blockchain protects its entries in the respective distributed database (blocks) and the corresponding log of transactions against manipulations by using cryptography. A block carries a set of transactions. Each block points to its previous block using a hash of the previous block. Because of this, manipulation of a block by changing the information is not possible or only possible to a limited degree.

According to further examples, the generated key comprises a private key of an asymmetric encryption scheme or a secret shared key of a symmetric encryption scheme. In case of an asymmetric encryption scheme, the control device may be provided with the public key matching into the private key, which has been generated based on the current constraint a parameter at the field device. Consequently, when for example the location of the field device changes, the private key generated based on the current location also changes such that the public key provided at the control device does not match anymore to the private key of the field device and an interaction between the control device and the field device is not possible outside the allowed location.

According to an embodiment, a method for operating a key generation device is provided. According to the method, a predefined operating constraint for operating a field device is received, and a basic key for the field device is generated. Furthermore, a key for a control device is generated based on the predefined operating constraints. The basic key may be transmitted to the field device and the key may be transmitted to the control device. The control device and the field device are configured to interact using the key and a further key which is generated at the field device based on the base key and a current constraints parameter relating to the predefined operating constraint. The key generated for the control device may be generated such that it matches to the further key generated at the field device as long as the current constraints parameter fulfills the predefined operating constraints. Thus, for example an encrypted communication between the control device and the field device based on the key and the further key may be enabled only as long as the current constraints parameter fulfills the predefined operating constraints.

According to an example, audit trail information may be reported from the key generation device to a distributed database. The audit trail information may indicate the transmission of the base key to the field device and the key to the control device. Such, a logging indicating that the keys have been distributed can be provided. The distributed database may comprise for example a decentralized distributed database or a database realized as a blockchain. This may enable that the audit trail information is stored secured and cannot be manipulated afterwards but may be retrievable for parties having an agreement on the predefined operating constraint.

According to a further example, the predefined operating constraints may be received from a distributed database. This may enable that the predefined operating constraint is stored secured and cannot be manipulated afterwards but may be retrievable for parties having an agreement on the predefined operating constraint.

According to an example, precision information is received at the key generation device and the basic key and/or the key may be generated based on the precision information. The precision information may be transmitted to the field device. The precision information may be an additional piece of information or may be included in the predefined operating constraint. For example, the predefined operating constraint may define a location at which the field device shall be allowed to execute a predefined function. The precision information may indicate for example a range with respect to the location, such that the field device is allowed to execute the predefined function within an area defined by the range and the location. This may contribute to avoid unwanted inhibition of executing the predefined function in case of measuring inaccuracy of for example the location in the field device.

According to another embodiment, a field device for interacting with a control device is provided. The field device comprises a communication interface and a logic. The logic is configured to receive a basic key from a key generation device. Furthermore, the logic is configured to determine a current constraints parameter relating to predefined operating constraints for operating the field device. Based on the base key and the current constraint parameter, the logic is configured to generate a key. The logic is configured to interact with the control device using the generated key, for example communicating with the control device via a communication encrypted with the generated key. The field device may be configured to perform any one of the above-described methods and therefore, the field device comprises also the above described advantages.

According to a further embodiment, a key generation device is provided. The key generation device comprises a communication interface and a logic. The logic is configured to receive a predefined operating constraint for operating a field device. Furthermore, the logic is configured to generate a base key for the field device and to generate a key for a control device based on the predefined operating constraints. The field device is configured to generate a further key based on the base key and a current constraint parameter relating to the predefined operating constraints. The control device and the field device are configured to interact using the key and the further key, respectively. The key generation device may be configured to perform any one of the above-described methods and therefore, the key generation device comprises also the above described advantages.

According to an embodiment, a computer program product (non-transitory computer readable storage medium having instructions, which when executed by a processor, perform actions) comprises program code. The program code may be executed by at least one processor. Executing the program code causes the at least one processor to perform a method for operating a field device. The field device is configured for interacting with a control device. The method comprises receiving, from a key generation device, a base key, determining a current constraint parameter relating to a predefined operating constraint for operating the field device, generating a key based on the base key and the current constraint parameter, and interacting with the control device using the generated key.

According to an embodiment, a computer program comprises program code. The program code may be executed by at least one processor. Executing the program code causes the at least one processor to perform a method for operating a key generation device. The method comprises receiving a predefined operating constraint for operating a field device, generating a base key for the field device, and generating a key for a control device based on the predefined operating constraint. The control device and the field device are configured to interact using the key and a further key generated at the field device based on the base key and a current constraint parameter relating to the predefined operating constraint.

According to an embodiment, a system is provided which comprises a field device as defined above, a key generation device as defined above, and a control device.

The above summary is merely intended to give a short overview over some features of some embodiments and implementations and is not to be construed as limiting. Other embodiments may comprise other features than the ones explained above.

BRIEF DESCRIPTION

Some of the embodiments will be described in detail, with reference to the following figures, wherein like designations denote like members, wherein:

FIG. 1 schematically illustrates a system for operating a field device according to the present disclosure;

FIG. 2 represents a flowchart of a method performed by a field device according to various examples; and FIG. 3 represents a flowchart of a method performed by a key generation device according to various examples.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 shows a system 100 comprising a field device 101, a control device 102 and a key generation device 103.

The field device 101 comprises for example a computing device, a gas turbine, a transformer, an industrial control device, an Internet of Things (IoT) device, a sensor, hard disk of a computer, a laptop, a notebook, or a smart phone. The field device may be provided by a device provider 104, for example a manufacturer of the field device 101. Operation of the field device 101 may be restricted to one or more certain areas and/or certain operating times. In other words, at least some functions of the field device 101 may be allowed to be executed only if these constraints are met. These constraints are agreed with a device user 105, for example a customer. Reasons for these constraints may be based on legal restrictions for the field device 101, service agreements or export restrictions. The agreement between the device provider 104 and the device user 105 may be stored via an agreement storage interface 106 in a distributed database 107. As illustrated in FIG. 1, the distributed database 107 may be realized as a decentralized database, in particular for example as a blockchain 108, which may store any agreements and data immutable. As the field device 101 is to be protected to be operated only if the constraints are met, the field device 101 is also called "system to protect".

The control device 102 may comprise for example a computer, a notebook, a tablet, a laptop, a smart phone or any other kind of device which may be configured to communicate with the field device 101, for example via a wireless or wired connection 109, to configure the field device 101 or to control the field device 101 to execute predefined functions. For example, the control device 102 may be configured to set up, enable and start operation of a gas turbine type field device 101. An application program may be provided at the control device 102 for communicating with the field device 101, for configuring the field device 101 and/or for controlling the field device 101 to execute the predefined functions.

The key generation device 103 may comprise for example a computer, notebook, a tablet, a laptop, a smart phone or any other kind of device which may be configured to generate keys which may be used for encrypting a communication or which may be used for an authentication procedure. The key generation device 103 may be used by the device provider 104 to generate a base key for the field device 101 and to generate an associated key for the control device 102. For example, the base key may be used in the field device 101 to generate a private key which includes current location and/or time information. The key for the control device 102 may comprise a public key and may be generated such that it matches to the private key for a specific location and/or time interval.

The field device 101 may comprise a sensor 110, a key modifier 111, a key store 112 and a key application 113. The key modifier 111, the key store 112 and the key application 113 may be implemented by a logic, for example in hardware, firmware, software, a specific hardware device and/or fully integrated into a customer chip of the field device 101, for example in a microprocessor executing software program code, or a combination thereof. The key application 113 may comprise a communication interface for communicating with the control device 102.

The sensor 110 may comprise for example a GPS receiver for determining the present location of the field device 101. Additionally, or as an alternative, the sensor 110 may comprise for example a real-time clock which provides the current time at the location of the field device 101. The sensor 110 may comprise any other type of sensor which is configured to sense information which is relevant with respect to the operating constraints agreed between the device provider 104 and the device user 105. For example, if the field device 101 is a component in a high voltage installation, for example a transformer, and if the field device 101 is, according to the operating constraints, allowed to be operated only in connection to a high voltage network operating at a certain voltage, the sensor 110 may comprise a voltage sensor providing information on the voltage the field device 101 is currently connected to.

The key modifier 111 may be configured to combine the base key from the key generation device 103 dynamically with the information from the sensor 110, for example with the current location of the field device 101, to generate one or more keys for the field device 101 whenever the information from the sensor 110 changes. The generated key may then be applied for further operations in the field device 101.

The key store 112 may be configured to receive the keys from the key modifier 111 and store all currently valid keys for applications running on the field device 101.

The key application 113 may comprise an application, in particular software code, which may apply the key or several keys of the key store 112 to certain purposes implemented in corresponding modules, for example an encryption module, a communication module and/or an authentication module.

The control device 102 may comprise a key application 114 and a key store 115. The key application 114 and the key store 115 may be implemented by a logic, for example in hardware, firmware, software, a specific hardware device and/or fully integrated into a customer chip of the control device 102, for example in a microprocessor executing software program code, or a combination thereof.

The key store 115 may be configured to receive keys from the key generation device 103 and store all currently valid keys for applications running on the control device 102.

The key application 114 may comprise an application, in particular software code, which may apply a key, or several keys stored in the key store 115 to certain purposes implemented in corresponding modules, for example an encryption module, a communication module and/or an authentication module, of the control device 102. The key application 114 may comprise a communication interface for communicating with the field device 101.

In the following, operation of the system 100 will be described in more detail. In particular, method steps 201 to 206 performed by the field device 101 will be described in connection with FIG. 2, and method steps 301 to 308 performed by the key generation device 103 will be described in connection with FIG. 3. Optional steps in FIGS. 2 and 3 are indicated by dashed boxes.

According to an example, the system 100 may use dynamic and continuous integration of the location of the field device 101 into the key(s) of the field device 101 in order to enable location-based functioning, authorization, authentication, and/or decryption of a storage of the field device 101. The key may comprise for example a private key of an asymmetric encryption scheme. For example, for a field device 101 like an edge device or a gas turbine, the device provider 104 issues a public key for accessing the field device 101 to the device user 105 which should be valid only in a specific area, for example a specific city. The field device 101 updates its private key whenever the location of the field device 101 changes. As long as the field device 101 stays in the agreed area, the device user 105 may use the public key to access the field device 101. If the fields device 101 leaves the defined area, the private key and the public key do not match anymore and the device user 105 cannot access the field device 101 anymore until it is returned to its defined location.

In detail, the device provider 104 and the device user 105 may reach an agreement under which constraints the field device 101 should be able to interact with the control device 102. For example, the field device 101 and the control device 102 should be able to communicate if the field device 101 is within an area of 1 km around a certain place in a certain city. In another example, the field device 101 may comprise a hard disk which should be allowed to be decrypted only in an area of for example 100 m around a certain office building. The agreement comprising for example additionally an identifier of the field device 101, a location and precision information related to the location as well as usage constraints, may be stored for example in the distributed database 107. For example, the device provider 104 and the device user 105 may confirm the agreement at the agreement storage interface 106 as indicated by arrows 116, 117, and the agreement may be stored in the distributed database 107 as indicated by arrow 118.

The service provider 104 may trigger a key generation at the key generation device 103 as indicated by arrow 119. In response to being triggered, the key generation device 103 may receive in step 301 the predefined operating constraint for operating the field device 101 from the distributed database 107 (arrow 120). Additionally, the key generation device 103 may receive in step 302 precision information related to the predefined operating constraint, for example a range around a location in which the field device 101 is allowed to be operated. The key generation device 103 generates in step 303, for example based on a random number, a base key for the field device 101 corresponding to the predefined operating constraint from the database 107.

For example, 256 bit keys may be required. The key generation device 103 may generate a 128 bit base key thus reserving 128 bits for the dynamically embedded constraint. In addition, in step 304, a corresponding key for the control device 102 is generated (for example also 256 bit) by a key derivation function considering the constraint information, for example the required location. When generating the base key for the field device 101 and the corresponding key for the control device 102 in steps 303 and 304, the key generation device 103 may also consider the precision information received in step 302.

The system 100 may use both symmetric and asymmetric keys. For symmetrical keys the shared key may be used on both the field device 101 and the control device 102. For asymmetric keys the field device 101 holds the private key and the control device 102 holds the corresponding public key. For example, the keys may be generated in the key generating device 103 based on techniques used by the BIP39 Mnemonic approach to generate deterministic key wallets.

In step 305 the key generation device 103 may transmit the base key to the field device 101 (arrow 121). In step 306, the key generation device 103 may transmit the corresponding key to the control device 102 (arrow 122).

Optionally, the key generation device 103 may transmit the precision information received in step 302 to the field device 101 in step 307. Furthermore optionally, the key generation device 103 may transmit audit trail information to the distributed database 107 in step 308. The audit trail information may indicate the transmission of the base key to the field device 101 and the transmission of the corresponding key to the control device 102.

In step 201, the field device 101 receives the base key from the key generation device 103 and stores the base key in the key modifier 111. In step 202 the constraint sensor 110 determines a current constraint parameter relating to the predefined operating constraint for operating the field device 101. The current constraint parameter is provided to the key modifier 111 as indicated by arrow 123. The predefined operating constraint may be preconfigured in the field device 101 or it may be received from the key generation device 103 or from the distributed database 107. The predefined operating constraint may indicate for example a location at which the field device 101 is allowed to execute a predefined function. In this case, the current constraint parameter may comprise a current location of the field device 101. Additionally, or as an alternative, the predefined operating constraint may indicate a predefined timing at which the field device 101 is allowed to execute a predefined function. In this case, the current constraint parameter may comprise a current time.

Optionally, in step 203, the key modifier 110 may receive precision information from the key generation device 103. The precision information may indicate a geographical range with respect to the location within which the field device 101 is allowed to execute the predefined function. Additionally, or as an alternative, the precision information may indicate a time window with respect to the timing within which the field device is allowed to execute the predefined function.

In step 204 the key modifier 111 generates a key based on the base key and the current constraint parameter. Additionally, when generating the key, the precision information may be considered. The generated key is stored in the key storage 112 (arrow 124) and may be used by the key application 113 as indicated by arrow 125.

The key storage 115 of the control device 102 stores the key received from the key generation device 103 (arrow 122), and the stored key may be used by the key application 114 as indicated by arrow 126.

At this point, the field device 101 and the control device 102 are configured to interact as indicated by arrow 109 (step 205). Interacting may comprise for example communicating data between the field device 101 and the control device 102 using the keys, or authenticating the control device 102 with respect to the field device 101 by using the keys. Additionally, or as an alternative, the field device 101 may store data signed and/or encrypted with its key in the database 107. This data can only be accessed/decrypted with a corresponding key in the control device 102. Furthermore, the field device 101 may use its key for storage encryption such that the control device 102 has access to this storage only in locations where the keys matches. This may make specific functionalities work only in certain areas or may protect from misusing of the field device 101 outside certain operational areas, for example when the field device 101, for example a notebook, is stolen.

As indicated by arrow 127, the constraint sensor 110 may continuously measure the current constraint parameter, for example the current location of the field device 101 or a current time, and may transfer the current constraint parameter continuously to the key modifier 111. The key modifier 111 may generate based on the changed measurement a new key for the field device 101 with a key derivation function which applies the predefined operating constraint, the precision information if available, the base key and the current constraint parameter. The key modifier 111 may update the latest key with the newly generated key in the key storage 112.

When interacting with the control device 102, the key application 113 applies the current key of the key storage 112 to outside interaction, for example communication, encryption and/or authentication. If the current key applied by the key application 113 of the field device 101 matches the corresponding key applied by the key application 114 of the control device 102, the devices 101 and 102 can interact. However, this is the case only as long as the measured current constraint parameter of the field device 101 embedded in the key of the field device 101 matches the constraints embedded in the key issued by the key generation device 103 to the control device 102. If the keys do not match, the corresponding functions, for example communication, encryption and/or authentication are not possible anymore and thus effectively prohibited.

Optionally, the field device 101 may report audit trail information to the distributed database 107 in step 206 (see arrow 127). Likewise, the control device 102 may optionally report audit trail information to the distributed database 107 (see arrow 128). The audit trail information may comprise for example system changes of the field device 101 and the control device 102, and information on interaction between the field device 101 and the control device 102.

Although the system 100 has been described above in various examples, the system 100 is not limited to the above examples. Many variations of the system 100 may be considered. For example, the constraint sensor 110 may not be directly embedded in the field device 101, but realized as a trusted external device, also called Oracle, which communicates with the key modifier 111 by signed messages either directly or over a distributed, decentralized database.

Furthermore, the above-described techniques may be applied to encryption or authentication of for example an Application Programming Interface (API). This may allow a location-based activation and deactivation of specific interface functionalities.

The above-described operation constraints in the keys may not only comprise location, but for example also time or time in combination with location or any combination with other constraints which can be reliably integrated in the key modifier, for example a voltage supervision.

Furthermore, when the device provider 104 triggers the generation of a new base key for the field device 101, previously issued keys may be automatically revoked at the key storage 112.

To sum up, the above-described techniques relate to a combination of a deterministic key generation function with a dynamically measured value and a basic key to inherently secure system interaction based on measurable constraints. The application of sensor measurements to entropy of the key generation function enables to invalidate previously issued keys if the constraints which were agreed in an issuing process are no longer met. This may result in an inherit protection of systems by blocking interaction based on non-matching cryptographic keys. Furthermore, if integrated in core components, for example communication or encryption chips, the system is tamperproof as the constraint measurement, for example location, cannot be easily corrupted. The constraint precision can be easily adapted with a smart encoding of the constraint, for example binary position encoding. Sufficient entropy for the key derivation function can be achieved by applying a large enough base key which will be generated with for example standard random key generators.

The above-described techniques may be applied to all kinds of devices which have a processor for calculating keys and where additionally a sensor can be attached.

After the configuration process, no connection or communication to any other central management system is needed as all information is embedded in the respective components of the field device 101 and the public key issued to the control device 102. The field device 101 and the control device 102 can interact fully independent from any other system and still it is guaranteed that the constraints are enforced. For example, location-based legal or commercial constraints can be easily enforced when the above-described techniques are integrated in the involved devices. This may enable a kind of business model where the level of mobility of an asset may be related to the pricing. In addition, the above-described techniques may be used to secure office equipment like hard disks of a notebook or personal computer, storing the confidential information based on location-based accessibility activation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a field device, the field device being configured for interacting with a control device, the method comprising:
    receiving by the field device from a key generation device, a base key,
    determining by the field device a current constraint parameter relating to a predefined operating constraint for operating the field device,
    generating by the field device a further key based on the base key and the current constraint parameter, wherein the further key is generated by dynamically modifying the base key with the current constraint parameter,
    interacting by the field device with the control device using the generated further key, wherein interacting includes communicating data between the field device and the control device using the generated further key, wherein the generated further key matches a key for the control device generated based on the predefined operating constraint,
    in response to a change to the field device related to the predefined operating constraint, updating, by the field device, the generated further key so that the updated generated further key does not match the key for the control device, and as a function of the updating, the field device no longer interacts with the control device,
    wherein the predefined operating constraint defines one or more constraints which must be fulfilled for operating the field device,
    wherein a predefined function is executed by the field device when the current constraint parameter fulfills the predefined operating constraint, and
    wherein the predefined function relates to a configuration and placing into operation of the field device issued by the control device.

2. The method of claim 1, wherein the predefined operating constraint indicates a location at which the field device is allowed to execute the predefined function, wherein the current constraint parameter comprises a current location of the field device.

3. The method of claim 2, further comprising:
    receiving, from the key generation device, precision information indicating a geographical range with respect to the location within which the field device is allowed to execute the predefined function, and
    generating the further key based on the precision information.

4. The method of claim 1, wherein the predefined operating constraint indicates a predefined timing at which the field device is allowed to execute the predefined function, wherein the current constraint parameter comprises a current time.

5. The method of claim 4, further comprising:
    receiving, from the key generation device, precision information indicating a time window with respect to the timing within which the field device is allowed to execute the predefined function, and
    generating the further key based on the precision information.

6. The method of claim 1, further comprising:
    reporting audit trail information to a distributed database, the audit trail information indicating interactions of the field device interacting with the control device using the generated key.

7. The method of claim 6, wherein the distributed database comprises at least one of a decentralized distributed database and a database realized as a blockchain.

8. The method of claim 1, wherein the generated key comprises at least one of a private key of an asymmetric encryption scheme and a secret shared key of a symmetric encryption scheme.

9. The method of claim 1, wherein interacting comprises at least one of communicating data between the field device and the control device, and authenticating the control device.

10. The method of claim 1, wherein the predefined function is not executed by the field device when the current constraint parameter does not fulfill the predefined operating constraint.

11. The method of claim 1, wherein the field device is at least one of a turbine, a transformer, an industrial control device, and an Internet of Things (IoT) device.

12. The method of claim 1, wherein the current constraint parameter being provided as a signed message from a trusted external device.

13. A method for operating a key generation device, the method comprising:
receiving a predefined operating constraint for operating a field device,
generating a base key for the field device,
transmitting the base key to the field device, and
generating a key for a control device based on the predefined operating constraint, wherein the control device and the field device are configured to interact using the key and a further key generated at the field device based on the base key and a current constraint parameter relating to the predefined operating constraint, wherein the control device and the field device are configured to interact by communicating data using the generated further key, and wherein the further key is generated by dynamically modifying the base key with the current constraint parameter, and wherein the generated further key matches the key for the control device based on the predefined operating constraint,
wherein, in response to a change to the field device related to the predefined operating constraint, the field device updates the generated further key so that the updated generated further key does not match the key for the control device, and as a function of the updating, the field device no longer interacts with the control device,
wherein the predefined operating constraint defines one or more constraints which must be fulfilled for operating the field device,
wherein a predefined function is executed by the field device when the current constraint parameter fulfills the predefined operating constraint, and
wherein the predefined function relates to a configuration and placing into operation of the field device issued by the control device.

14. The method of claim 13, further comprising:
transmitting the key to the control device.

15. The method of claim 14, further comprising:
reporting audit trail information to a distributed database, the audit trail information indicating the transmission of the base key to the field device and the key to the control device.

16. The method of claim 13, further comprising:
receiving the predefined operating constraint from a distributed database.

17. The method of claim 13, further comprising:
receiving precision information,
generating the base key and the key based on the precision information, and
transmitting the precision information to the field device.

18. The method of claim 13, wherein the current constraint parameter being provided as a signed message from a trusted external device.

19. A field device for interacting with a control device, the field device comprising a processor, a communication interface, and a logic configured to:
receive, from a key generation device, a base key,
determine a current constraint parameter relating to a predefined operating constraint for operating the field device,
generate a further key based on the base key and the current constraint parameter, wherein the further key is generated by dynamically modifying the base key with the current constraint parameter,
interact with the control device using the generated further key, wherein data communicated when the field device interacts with the control device uses the generated further key, and wherein the generated further key matches a key for the control device generated based on the predefined operating constraint, and
in response to a change to the field device related to the predefined operating constraint, updating, by the field device, the generated further key so that the updated generated further key does not match the key for the control device, and as a function of the updating, the field device no longer interacts with the control device,
wherein the predefined operating constraint defines one or more constraints which must be fulfilled for operating the field device,
wherein a predefined function is executed by the field device when the current constraint parameter fulfills the predefined operating constraint, and
wherein the predefined function relates to a configuration and placing into operation of the field device issued by the control device.

20. A key generation device, comprising a processor, a communication interface, and a logic configured to:
receive a predefined operating constraint for operating a field device,
generate a base key for the field device,
transmit the base key to the field device, and
generate a key for a control device based on the predefined operating constraint, wherein the control device and the field device are configured to interact using the key and a further key generated at the field device based on the base key and a current constraint parameter relating to the predefined operating constraint, wherein the control device and the field device are configured to interact by communicating data using the key and the further key generated at the field device based on the base key and the current constraint parameter, wherein the further key is generated by dynamically modifying the base key with the current constraint parameter, and wherein the generated further key matches the key for the control device based on the predefined operating constraint,
wherein, in response to a change to the field device related to the predefined operating constraint, the field device updates the generated further key so that the updated generated further key does not match the key for the control device, and as a function of the updating, the field device no longer interacts with the control device,
wherein the predefined operating constraint defines one or more constraints which must be fulfilled for operating the field device, wherein a predefined function is executed by the field device when the current constraint parameter fulfills the predefined operating constraint, and wherein the predefined function relates to a configuration and placing into operation of the field device issued by the control device.

\* \* \* \* \*